US011671506B2

(12) United States Patent
Dinh et al.

(10) Patent No.: US 11,671,506 B2
(45) Date of Patent: Jun. 6, 2023

(54) MICROSERVICE MANAGEMENT SYSTEM FOR RECOMMENDING MODIFICATIONS TO OPTIMIZE OPERATION OF MICROSERVICE-BASED SYSTEMS

(71) Applicant: Dell Products L. P., Round Rock, TX (US)

(72) Inventors: Hung The Dinh, Austin, TX (US); Shubham Gupta, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 16/752,798

(22) Filed: Jan. 27, 2020

(65) Prior Publication Data

US 2021/0234930 A1 Jul. 29, 2021

(51) Int. Cl.
*H04L 67/51* (2022.01)
*H04L 67/10* (2022.01)
*H04L 43/0817* (2022.01)
*G06F 8/75* (2018.01)
*G06F 8/41* (2018.01)
*H04L 67/63* (2022.01)

(52) U.S. Cl.
CPC ............. *H04L 67/51* (2022.05); *G06F 8/425* (2013.01); *G06F 8/75* (2013.01); *H04L 43/0817* (2013.01); *H04L 67/10* (2013.01); *H04L 67/63* (2022.05)

(58) Field of Classification Search
CPC ....... H04L 67/16; H04L 67/10; H04L 67/327; H04L 43/0817; H04L 67/51; H04L 67/63; G06F 8/75; G06F 8/425
See application file for complete search history.

(56) References Cited

U.S. PATENT DOCUMENTS

| 10,223,242 | B1 * | 3/2019 | Kommera | G06F 11/3684 |
| 10,379,995 | B1 * | 8/2019 | Walters | G06T 7/246 |
| 10,412,154 | B2 * | 9/2019 | Vyas | H04L 12/14 |
| 10,599,538 | B2 * | 3/2020 | Vichare | G06F 11/302 |
| 10,601,900 | B2 * | 3/2020 | Chen | G06Q 20/0658 |
| 10,831,898 | B1 * | 11/2020 | Wagner | G06F 21/52 |
| 2003/0191685 | A1 * | 10/2003 | Reese | G06Q 30/0267 |
| | | | | 705/14.67 |
| 2007/0204279 | A1 * | 8/2007 | Warshavsky | G06F 9/541 |
| | | | | 719/330 |

(Continued)

FOREIGN PATENT DOCUMENTS

CA 3008844 A1 * 12/2018 ............... G06F 8/65

*Primary Examiner* — Ninos Donabed
(74) *Attorney, Agent, or Firm* — Krishnendu Gupta; Deepika Bhayana; Derek Lam

(57) ABSTRACT

A method, system and computer-usable medium are disclosed for executing a comparative analysis of microservice profiles and recommending modifications to a microservice. In at least one embodiment, a plurality of microservice analysis daemons and a plurality of microservices are deployed to nodes of a network. Run-time execution characteristic of the plurality of microservices are monitored and gathered by the analysis daemons for microservices executed at the node at which the microservice analysis daemon is deployed. Microservice profiles are generated using the run-time execution characteristics data and data retrieved from a service registry. Recommendations regarding modification of one or more microservices are made based on the results of a microservice profile comparative analysis.

17 Claims, 11 Drawing Sheets

(56) References Cited

U.S. PATENT DOCUMENTS

| | | | |
|---|---|---|---|
| 2012/0158753 A1* | 6/2012 | He | G06F 16/957 |
| | | | 707/752 |
| 2014/0297354 A1* | 10/2014 | Kogiso | G06F 9/48 |
| | | | 705/7.26 |
| 2015/0058459 A1* | 2/2015 | Amendjian | G06F 9/45558 |
| | | | 709/223 |
| 2017/0109183 A1* | 4/2017 | Cropper | G06F 1/3203 |
| 2017/0364434 A1* | 12/2017 | Kairali | G06F 11/3668 |
| 2018/0113799 A1* | 4/2018 | M.V. | G06F 11/3688 |
| 2018/0165604 A1* | 6/2018 | Minkin | G06Q 10/06 |
| 2018/0197190 A1* | 7/2018 | Debusmann | G06Q 10/0637 |
| 2018/0285165 A1* | 10/2018 | Helsley | G06F 9/5077 |
| 2019/0065576 A1* | 2/2019 | Peng | G06F 16/22 |
| 2019/0197422 A1* | 6/2019 | Chen | G06K 9/6268 |
| 2019/0236617 A1* | 8/2019 | Gholston | G06Q 30/016 |
| 2019/0273746 A1* | 9/2019 | Coffing | G06Q 20/40 |
| 2020/0034493 A1* | 1/2020 | Kempf | G06F 16/2457 |
| 2020/0034685 A1* | 1/2020 | Kempf | G06F 16/951 |
| 2020/0034750 A1* | 1/2020 | Ritter | G06N 20/00 |
| 2020/0034758 A1* | 1/2020 | Byron | G06N 20/00 |
| 2020/0097809 A1* | 3/2020 | Velasco | G06N 20/00 |
| 2020/0110598 A1* | 4/2020 | Liu | G06F 8/71 |
| 2020/0201679 A1* | 6/2020 | Wentz | G06F 9/5044 |
| 2020/0272912 A1* | 8/2020 | Chacko | G06N 20/00 |
| 2021/0089361 A1* | 3/2021 | Rafey | G06N 20/00 |
| 2021/0157710 A1* | 5/2021 | Alexander | G06N 20/00 |
| 2021/0200819 A1* | 7/2021 | Earhart | G06N 20/00 |

\* cited by examiner

MICROSERVICE MANAGEMENT SYSTEM FOR RECOMMENDING MODIFICATIONS TO OPTIMIZE OPERATION OF MICROSERVICE-BASED SYSTEMS

BACKGROUND

Technical Field

This invention relates generally to the management of microservices and, more particularly to the management of microservice configuration and topology using run-time characteristics of the microservices to suggest microservice modifications that may optimize the operation of microservice-based systems.

Description of Related Technologies

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To this end, new capabilities that employ cloud-based architectures are consistently under development. In particular, software development techniques such as microservice-based development are gaining in favor. Microservices are a variant of the service-oriented architecture (SOA) architectural style that structures an application as a collection of loosely coupled services. In a microservices architecture, services are fine-grained and the protocols are lightweight. One benefit of decomposing an application into smaller services is that such an approach improves modularity. This makes the application easier to understand, develop, and test, while also parallelizing development by enabling small autonomous teams to develop, deploy, and scale their respective services independently, thereby facilitating continuous development, integration, testing, delivery, and deployment.

SUMMARY

This Summary provides a simplified form of concepts that are further described below in the Detailed Description. This Summary is not intended to identify key or essential features and should therefore not be used for determining or limiting the scope of the claimed subject matter.

A system of one or more computers is disclosed that can be configured to perform particular operations or actions by virtue of having software, firmware, hardware, or a combination of them installed on the system that in operation causes or cause the system to execute a comparative analysis of microservice profiles pursuant to recommending modifications to a microservice. One general aspect includes a computer-implemented method for managing microservices wherein a plurality of microservice analysis daemons and a plurality of microservices are deployed to nodes of a network. The plurality of microservices executed at the nodes of the network may be registered with a service registry. Run-time execution characteristic for the plurality of microservices may be monitored using the microservice analysis daemons, where the microservice analysis daemons gather execution characteristic data for microservices executed at the node at which the microservice analysis daemon is deployed. Microservice profiles for the plurality of microservices may be generated using execution characteristics data obtained from the microservice analysis daemons and data retrieved from the service registry, where the microservice profiles are subject to a comparison operation. Recommendations regarding modification of one or more microservices may be made based on the results of the comparison operation. Other embodiments of this aspect include corresponding computer systems, apparatus, and computer programs recorded on one or more computer storage devices, each configured to perform the actions of the methods.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Overview

Figure 1:
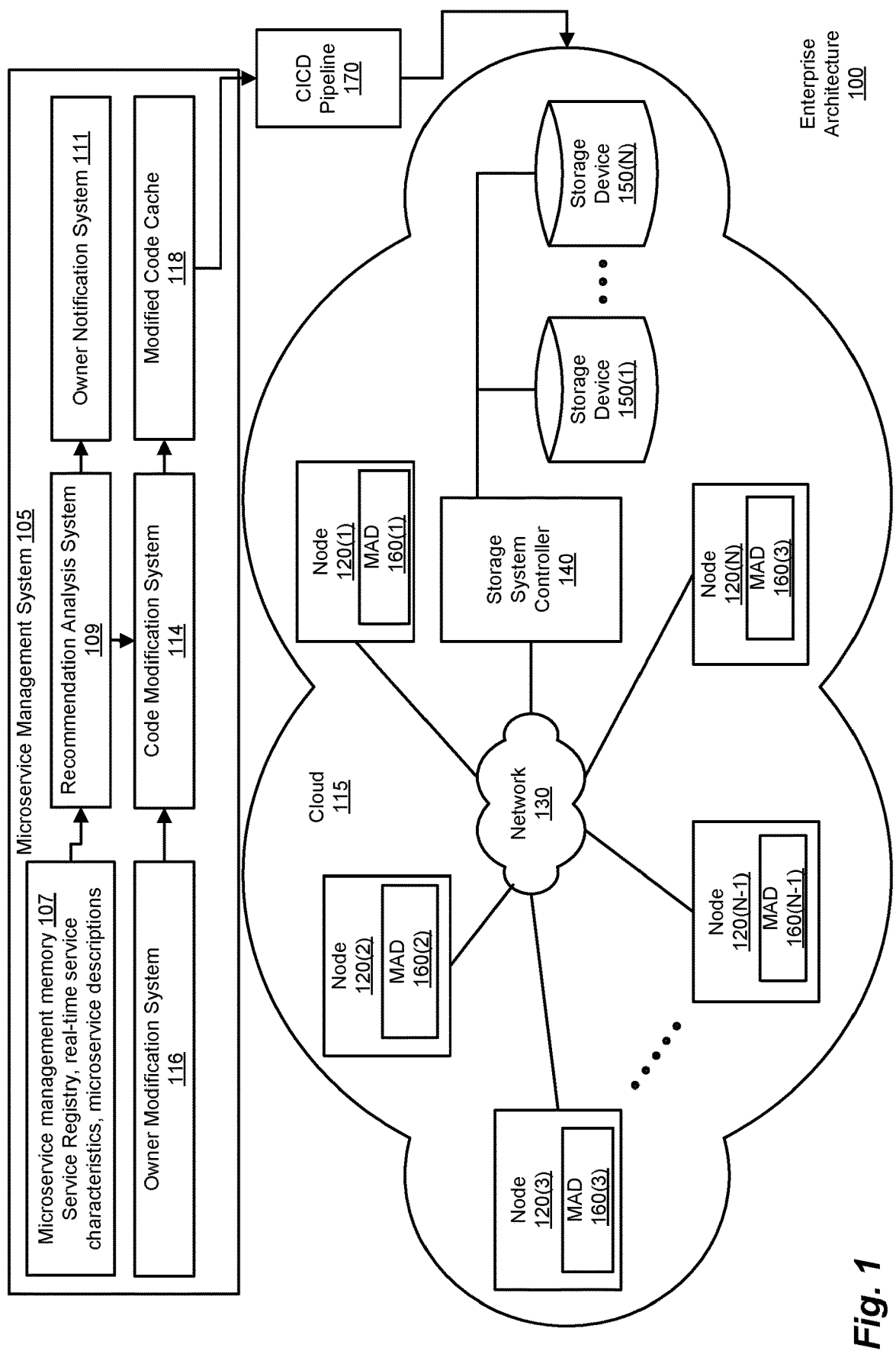
FIG. 1 is a simplified block diagram illustrating an example of an enterprise architecture, according to some embodiments.

Methods and systems such as those described herein can be implemented, for example, as a method, network device, and/or computer program product, and provide for the management of microservice configuration and topology through the use of information including one or more of: 1) run-time service monitoring of microservice execution; 2) registry information provided during registry of microservices; and/or 3) supplemental information provided by microservice owners and/or lexical analysis of a microservices codebase.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Introduction

As noted, methods and systems such as those described herein provide for the management of microservice configuration and topology through recommendations of microservice modifications based on a comparative analysis of corresponding microservice profiles. Such management can include the automated gathering of run-time information regarding one or more microservices pursuant to generating a microservice profile for the microservice. In addition to the run-time information, the microservice profile may be generated using service registry data and, in some embodiments, microservice information provided by microservice owners and/or microservice information obtained through a lexical analysis of a microservice codebase. Microservice profiles generated in the disclosed system may include records respectively associated with the microservice profiles, where the record for a profile includes tokenized information including one or more of: keywords associated with code characteristics of the microservice; variables and/or function names used by the microservice; literals used by the microservice; and text comments associated with the microservice.

Certain embodiments of the disclosed system make recommendations for microservice modifications based on a comparative analysis of the microservice profiles. Exemplary recommendations include: deleting a microservice; consolidating multiple microservices into fewer microservices; recommendations intended to optimize deployment of the microservices; recommendations to update a microservice, etc.

Programming techniques directed to disintegrating existing monolithic applications into microservices and moving those microservices into cloud-based environments has become increasingly attractive due to the improved performance and scalability such approaches provide. Implementation of a microservice architecture, however, is not without its challenges. Arguably, such a direction can also lead to increase complexity as such disintegrated applications become more and more distributed. Unintended consequence of such complexity can include the time, effort, and resources wasted in creating microservices that are similar or identical to existing microservices, and the various inadequacies of source code control techniques in addressing such challenges, including the need to register such microservices and the need to establish organizational acceptance of such processes and procedures. Moreover, such approaches can suffer from a lack of accountability with regard to the cloud resources used to support a given set of microservices, and which environments are to be employed thereby. This also results in the lack of a centralized location for the organized storage and maintenance of such information. Such problems can be avoided through the implementation of microservice management approaches that employ methods and systems such as those described herein.

Example Enterprise Architecture

FIG. 1 is a simplified block diagram illustrating an example of an enterprise architecture, according to some embodiments. To that end, FIG. 1 depicts an enterprise architecture 100 including a microservice management system 105 configured to recommend microservice modifications based, at least in part, on run-time execution characteristics of the microservices. Microservice management system 105 is communicatively coupled to a continuous integration, continuous deployment (CICD) pipeline 170. In certain embodiments, code that has been modified pursuant to recommended microservice modifications is communicated to the CICD pipeline 170 for deployment to a cloud 115, and more particularly, to a number of cloud-based computing systems (depicted in FIG. 1 as nodes 120(1)-(N)), via a network 130. In certain embodiments, the cloud 115 is associated with an entire enterprise and/or organizations within the enterprise. Nodes 120(1)-(N) are also coupled, via network 130, to a storage system controller 140. Storage system controller 140 provides nodes 120(1)-(N) with access to networked data storage, for example, by way of providing access to a number of storage devices (depicted in FIG. 1 as storages devices 150(1)-(N)). As can be seen in FIG. 1, data can be stored by storage system controller 140 in storage devices 150(1)-(N) (referred to in the aggregate as storage devices 150) on behalf of nodes 120(1)-(N).

Cloud 115 also includes a number of microservice analyzer daemons. These microservice analyzer daemons (MADs 160(1)-(N), referred to in the aggregate as microservice analyzer daemons 160) are executed by corresponding nodes 120 (1)-(N) of cloud 115, and are configured to monitor run-time activity of microservices executed on the corresponding nodes 120. As illustrated in FIG. 1, each of the nodes 120 includes at least one corresponding daemon. However, it will be appreciated, in view of the teachings of the present disclosure, that nodes that do not execute microservices (e.g., as might be the case where one or more of nodes 120 are used for purposes other than executing microservice(s)) need not have corresponding daemons.

It will be appreciated that, in light of the present disclosure, the variable identifier "N" is used in several instances in various figures herein to more simply designate the final element of a series of related or similar elements (e.g., nodes 120(1)-(N) and microservice analysis daemons 160(1)-(N)). The repeated use of such variable identifiers is not meant to imply a correlation between the number of elements in such series. The use of variable identifiers of this sort in no way is intended to (and does not) require that each series of elements have the same number of elements as another series delimited by the same variable identifier. Rather, in each instance of use, identified variables may represent the same or a different value than other instances of the same variable identifier.

Microservice management system 105 is communicatively coupled to daemons 160 to provide run-time service characteristics for instances of microservices executed on nodes 120. The run-time characteristics obtained by the daemons 160 for the microservice instances are stored in microservice management memory 107. In certain embodiments, microservice management memory 107 also stores service registry information that is generated when a microservice is registered with, for example, a container orchestration system, such as a Kubernetes orchestration system. In certain embodiments, the microservice management system 105 copies its own instance of the service registry using the registry information of the container orchestration system. In certain embodiments, the microservice management system 105 generates its own instance of the service registry using information received from microservice analysis daemons 106. The service registry information in certain embodiments includes the HTTP input address for the microservice, the HTTP output address for the microservice, and the name of the microservice.

In some embodiments, the microservice management memory 107 also stores microservice descriptions. Microservice descriptions may be provided by microservice owners to describe one or more of the functionality of the microservice, inputs to the microservice, outputs from the microservice, comments relating to the business purpose of the microservice, and/or any other information that is useful for microservice recommendations, as described herein. In certain embodiments, microservice descriptions may be obtained through lexical analysis of microservice code.

In the example shown in FIG. 1, the microservice management memory 107 is accessible to a recommendation analysis system 109. The recommendation analysis system 109 is configured to use information stored in the microservice management memory 107 to generate recommendations for modifications of the microservice code. Certain embodiments include an owner notification system 111 that notifies microservice owners that the recommendation analysis system 109 is recommending a modification to microservice code that a microservice owner may consider for implementation. In some embodiments, the notification includes an identification of the name of the microservice, a link to the microservice code, a description of the recommendation, and/or an identification of other microservices that may be impacted if the microservice owner decides to modify the microservice code to implement the recommendation.

Based on the teachings of the present disclosure, it will be recognized that a wide range of recommendations may be suggested based on an analysis of the information in the microservice management memory 107. In at least one embodiment, the recommendation analysis system 109 may be configured to suggest one or more of: 1) consolidation of two or more microservices into a single microservice; 2) the elimination of a microservice; and/or 3) an update to the microservice code to change the format of the received and/or output payload.

Certain embodiments of the microservice management system 105 include a code modification system 114. The code modification system 114 may be configured to allow a microservice owner to modify microservice code through an owner modification system 116. In certain embodiments, the owner modification system 116 allows the owner to access details of the recommendations and modify the code at, for example, a user interface. In certain embodiments, the code modification system 114 is configured to automatically implement code changes suggested by the recommendation analysis system 109. In at least one embodiment, microservice owners are notified of changes that have been automatically made to the microservice code using the owner notification system 111.

The code modification system 114 may also be configured to store modified microservice code and/or snippets of the modified code in a modified code cache 118. In the example shown in FIG. 1, the modified microservice code is provided to the input of a continuous integration, continuous deployment (CICD) pipeline 170.

CICD pipeline 170 implements both continuous integration and continuous deployment processes, as will be discussed in greater detail herein in connection with FIG. 5. Starting with the given codebase (e.g., as for a microservice or portion thereof), continuous integration (CI) facilitates the practice of generating and merging working portions of the modified code to a shared mainline version of the microservice. Modification and integration of microservice code may occur multiple times during a given period of time. Such practices provide for small, manageable pieces of code that may be applied frequently. In addition to enabling the performance of unit and integration testing on these pieces, such processes can run additional static and dynamic tests, measure and profile performance, extract and format documentation from the source code, and/or facilitate manual quality assurance (QA) processes.

Continuous deployment (CD) can take as its input, for example, the integrated and tested microservice(s) (or portions thereof), and, ultimately, release the software as newly-released microservices (e.g., microservice code and/or microservice configuration information). In certain embodiments, the CD operations can include the packaging of the software, automated delivery of the software (e.g., to a software repository), automated deployment of the software, and/or as the monitoring of the deployed software. As will be appreciated in light of the present disclosure, the continuous nature of such implementations contemplates a software engineering approach in which software is produced in comparatively short cycles (e.g., on the order of ten minutes or less, in certain embodiments). Such production enables the reliable release of the software to a code repository in a substantially continuous fashion. Continuous deployment thus addresses the problem of overloading operations teams with manual processes that slow down the delivery of software, and builds on the benefits of continuous delivery by automating the next stage in the pipeline. In generating software in this fashion, CICD pipeline 170 is able to deploy newly-released microservices (e.g., microservice code and/or microservice configuration information that has been created, or existing microservice code and/or microservice configuration information that has been modified) to cloud 115 for execution at, for example, one or more of nodes 120. As will be appreciated in light of the present disclosure, microservice analyzer daemons 160, microservice management system 105, and CICD pipeline 170 facilitate integration and deployment of modified microservices and their parameters to render the operations and interrelationships between the microservices more efficient. In certain embodiments, recommended modifications may occur in an automated fashion (that is, without the need for human intervention or input, though in so stating, such automation not completely precluding such human intervention or input).

Figure 2:
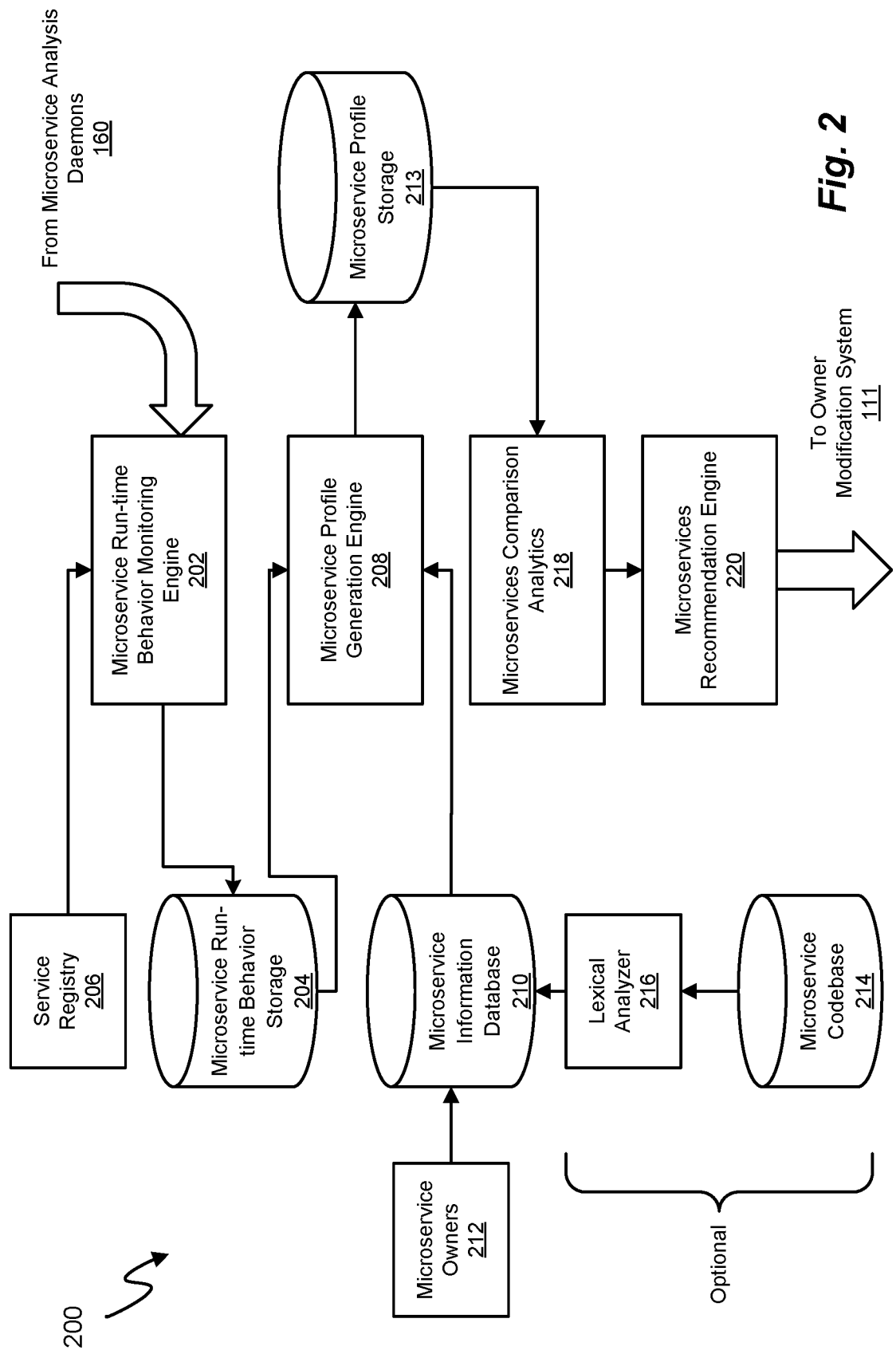
FIG. 2 is a simplified block diagram illustrating an exemplary recommendation analysis system that may be used in a microservice management system.

FIG. 2 is a simplified block diagram illustrating an exemplary recommendation analysis system 200 that may be used, for example, in the microservice management system 105 shown in FIG. 1. In at least one embodiment, a microservice run-time behavior monitoring engine 202 accepts run-time execution information for deployed microservices from the microservice analysis daemons 106 and correlates that information with the corresponding microservices for storage in microservice behavior storage 204. As such, microservice behavior storage 204 includes records correlating a microservice with its run-time behavior. The particular run-time behaviors that are gathered by the microservice analysis daemons 160 can be varied. In certain embodiments, the HTTP addresses of microservices communicating information to the microservice are monitored. In certain embodiments, the HTTP addresses of microservices to which the microservice sends information are monitored. In certain embodiments, the payloads of the input and output of the microservice are monitored and stored in the microservice behavior storage 204. It will be recognized, based on the teachings of the present disclosure, that other run-time behaviors of the microservices may be monitored and stored in microservice behavior storage 204.

The example of the recommendation analysis system 200 shown in FIG. 2, also includes a service registry 206, which stores the name of each active micro service, the HTTP input address for each active microservice, and the name or other identifier of the microservice. Such information is stored for a microservice when an instance of the microservice begins its execution at a node, and is removed from the service registry 206 when the instance of the microservice is deactivated and no longer being executed on the node. The microservice run-time behavior monitoring engine 202 may correlate the HTTP addresses for microservices registered in the service registry 206 with HTTP addresses reported by the microservice analysis daemons 160 to determine which microservices communicate with the microservice of interest during run time. In some embodiments, the correlated run-time behavior for the microservice may be stored in the microservice behavior storage 204 using, for example, names and/or identifiers of other microservices that communicated with the microservice of interest during run time.

Certain embodiments of the recommendation analysis system 200 employ a microservice profile generation engine 208, which generates profiles for the microservices and stores the generated profiles in a microservice profile storage 213. In certain embodiments, the microservice profile generation engine 208 accesses microservice run-time behavior from microservice behavior storage 204, and other microservice information from microservice information database 210. In certain embodiments, the microservice information database receives microservice descriptor and other information provided by microservice owners 212 for their microservices. The information provided by the microservice owners may include an identification of microservices used by a microservice of interest, names of the microservices, identifiers for the microservices. In certain embodiments, the information may include business information relating to the types of data received and output by the microservice. As an example, a microservice may receive an identification of a customer account (e.g., Account_Id) and output the total sales for the account (e.g., Account_Sales). In certain embodiments, the information may include comments from the microservice owners describing operations that are executed by the microservice. It will be recognized, based on the teachings of the present disclosure, that other microservice information may be provided by microservice owners and incorporated into microservice information database 210.

In certain embodiments, the microservice information database 210 includes information extracted from the microservice code stored in a microservice codebase 214. To this end, the code in the microservice codebase may be accessed by a lexical analyzer 216. In certain embodiments, the lexical analyzer 216 generates tokens from the microservice code and stores those tokens, for example, in the microservice information database 210. Such analyzers can employ a variety of analysis methodologies, and so can employ approaches such as multi-encoding or term frequency-inverse document frequency (TFIDF) analysis. Multi-encoding employs an architecture that facilitates the efficient tokenization of incoming microservice characteristics using machine learning to determine the potential categories (token names) and the occurrence of such elements. TFIDF is a numerical statistic that is intended to reflect how important a word is to a document in a collection or corpus. It is often used as a weighting factor in searches of information retrieval, text mining, and user modeling. A TFIDF value increases proportionally to the number of times a word appears in the document and is offset by the number of documents in the corpus that contain the word, which helps to adjust for the appearance of some words more frequently in general. However, TFIDF analysis is not able to perform learning, and so generally is not able to provide results comparable to machine learning approaches. For example, using TFIDF analysis as a baseline, multi-encoder provides a mean reciprocal rank (MRR) of 0.17, while TFIDF analysis provides an MRR of 0.09, for a given set of microservice characteristics.

The example shown in FIG. 2 includes microservices comparison analytics 218, which analyzes the microservice profiles to identify similarities and/or differences between microservices. The similarities and/or differences between multiple microservice profiles are provided to the microservices recommendation engine 220. In certain embodiments, the microservices recommendation engine 220 uses the similarities and/or differences to recommend modifications that should be made to the microservice code, as described herein. In certain embodiments, recommendations made by the microservices recommendation engine 220 may be provided to the owner notification system 111, which may operate in the manner disclosed herein.

Figure 3:
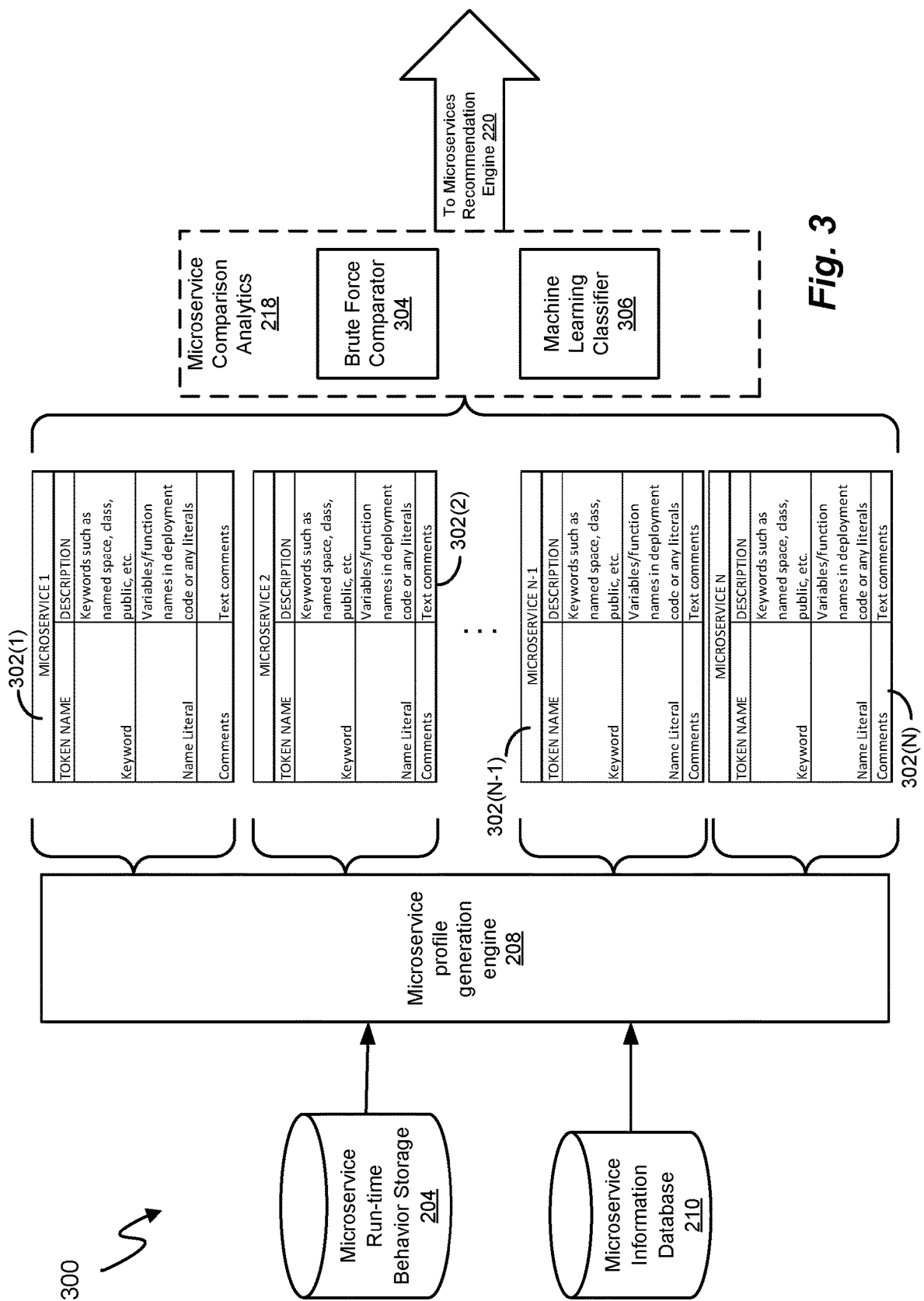
FIG. 3 is a simplified system diagram showing interactions between a microservice profile generation engine and a microservice comparison analytics pursuant to analyzing microservice profiles for differences and/or similarities.

FIG. 3 is a simplified system diagram 300 showing interactions between the microservice profile generation engine 208 and the microservice comparison analytics 218 to analyze the microservice profiles for differences and/or similarities. In this example, the microservice profile generation engine 208 correlates the run-time behavior for a microservice in microservice behavior storage 204 with microservice information stored in the microservice information database 210. In the example shown in FIG. 3, the microservice profile generation engine 208 creates a profile record for each microservice, shown here as microservice 302(1) through microservice 302(N). The microservice profiles in this example include tokens that can be analyzed to ascertain similarities and/or differences between the microservices. Here, the profiles include tokens for keywords (e.g., keywords such as those describing a namespace, class, public, etc.), tokens for name literals (e.g., any literals including, for example, variables and/or function names used in the deployment of the microservice), and tokens for comments (e.g., comments provided by the microservice owner). However, based on the teachings of the present disclosure, other manners of arranging information that can be used to compare microservices may also be employed, the foregoing being a non-limiting example.

In certain embodiments, the microservice profiles are provided to the comparison analytics 218. In certain embodiments, the comparison analytics 218 compare microservice profiles using a brute force comparator 304, which compares the profile of each microservice that is to be analyzed with the profiles of every other microservice that is to be analyzed. In certain embodiments, the microservice profiles are provided to a machine learning classifier 306, which provides a classification for the similarities and/or differences between multiple microservice profiles. In certain embodiments, the brute force comparator 304 and/or the machine learning classifier 306 may compute a comparison score corresponding to the degree to which a given microservice profile is similar and/or different from another microservice profile. In certain embodiments, the comparison score may be used as a threshold value to determine whether modification recommendations will be made by the microservices recommendation engine 220. As an example, in certain embodiments, the comparison analytics along with the comparison score are provided to the microservices recommendation engine 220. The microservice recommendation engine 220 may elect to provide recommendations for comparisons having a comparison score above and/or below a predetermined threshold value. In certain embodiments, the comparison analytics 218 only communicates the information from the comparison analytics if the comparison score is above and/or below a predetermined threshold value so that the microservices recommendation engine 220 only consumes system resources for comparisons warranting a recommendation.

Figure 4:
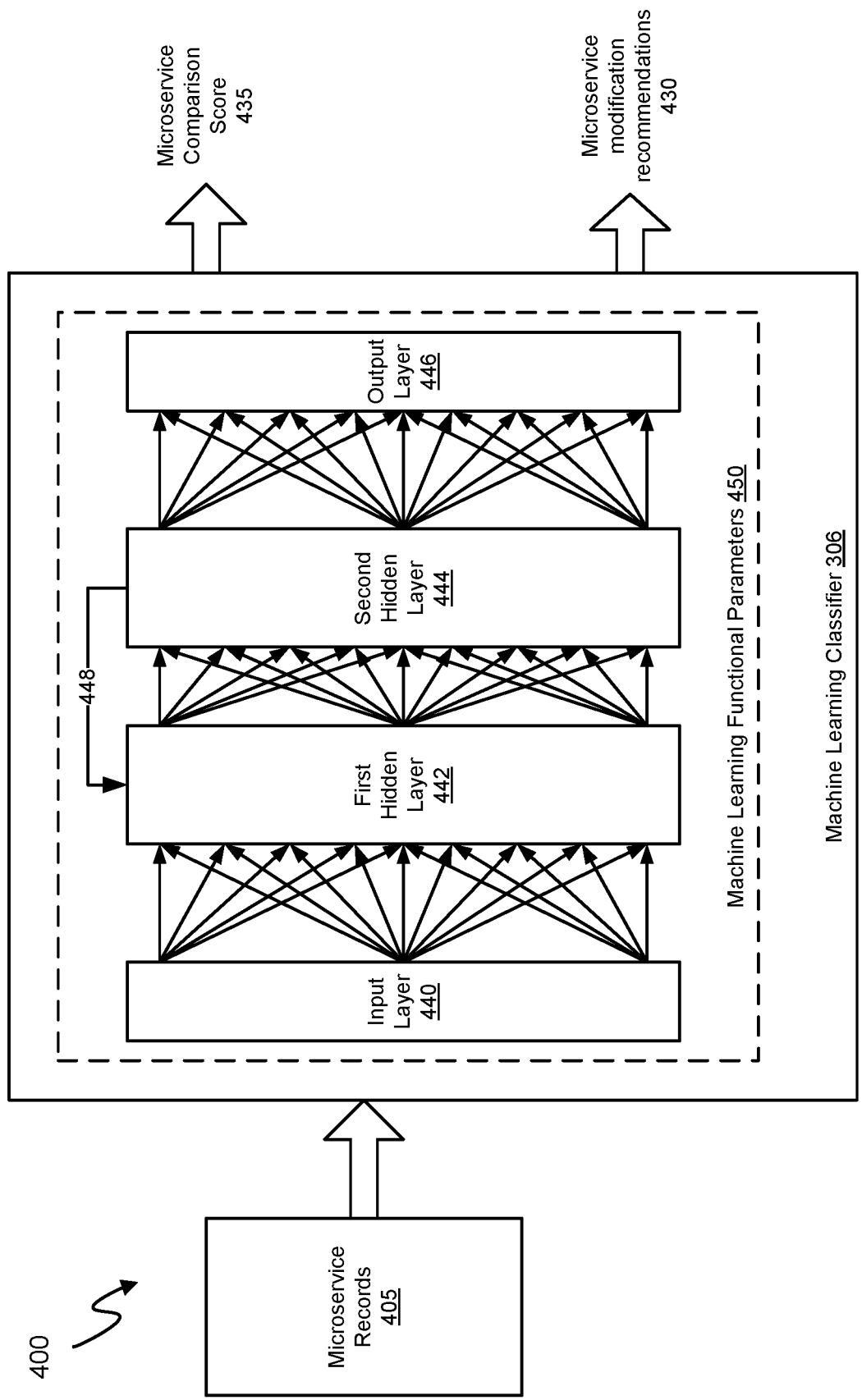
FIG. 4 is a simplified block diagram illustrating an example of a machine learning classifier that may be used in some embodiments of the disclosed system.

FIG. 4 is a simplified block diagram illustrating an example of a machine learning classifier 306 that may be used in some embodiments of the disclosed system. FIG. 4 depicts a machine learning classifier 306, as a more detailed example of components that might be found, for example, in the microservice comparison analytics 218 of the system 300 shown in FIG. 3. In this example, machine learning classifier 306 takes as its input microservice profile records 405 and produces microservice comparison information that is taken as input by microservices recommendation engine 220. In certain embodiments, the machine learning classifier 306 provides a microservice comparison score 435. In certain embodiments, the machine learning classifier 306 provides the actual microservice recommendations.

Machine learning classifier 306 is depicted in FIG. 4 as a recurrent neural network (a class of artificial neural networks where connections between nodes form a directed graph along a temporal sequence), and so includes an input layer 440, a first hidden layer 442, a second hidden layer 444, and an output layer 446. As is illustrated, input layer 440 takes as its input tokenized information generated by the microservice profile generation engine 208, and generates some number of outputs that are fed into first hidden layer 442. In turn, the first hidden layer 442 generates some number of outputs that are provided as inputs to the second hidden layer 444. Next, second hidden layer 444 generates outputs that are provided as inputs to output layer 446. Output layer 446, in turn, generates microservice modification recommendations 430 and, optionally, a microservice comparison score 435.

Notwithstanding the illustration of the recurrent neural network in FIG. 4, machine learning classifier 306 can be implemented using any one of a number of machine learning techniques. For example, a long short-term memory (LSTM) recurrent neural network technique can be used to good advantage in applications such as those described herein. LSTM techniques employ feedback connections (in contrast to feedforward architecture employed in certain other machine learning techniques). LSTM can therefore not only process single data points, but also entire sequences of data, such as the tokenized information in the microservice profiles. That being the case, also illustrated in FIG. 4 is the provision by a feedback of the second hidden layer 444 (depicted in FIG. 4 as feedback 448) to the first hidden layer 442. In these architectures, such feedback supports learning with respect to the effects produced by modifications to the microservices, and so provides one of the ways in which a system can learn how microservice performance can be improved.

As will be appreciated in light of the present disclosure, the machine learning classifier 306 can be described, in part, by some number of parameters, which are illustrated in FIG. 4 as machine learning functional parameters 450. Machine learning functional parameters 450 may include parameters for machine learning classifier 306 such as weights, biases, connections, information regarding one or more statistical models and functions used in the machine learning layers, function gradients, and the like, of the layers and connections of machine learning classifier 306.

Figure 5:
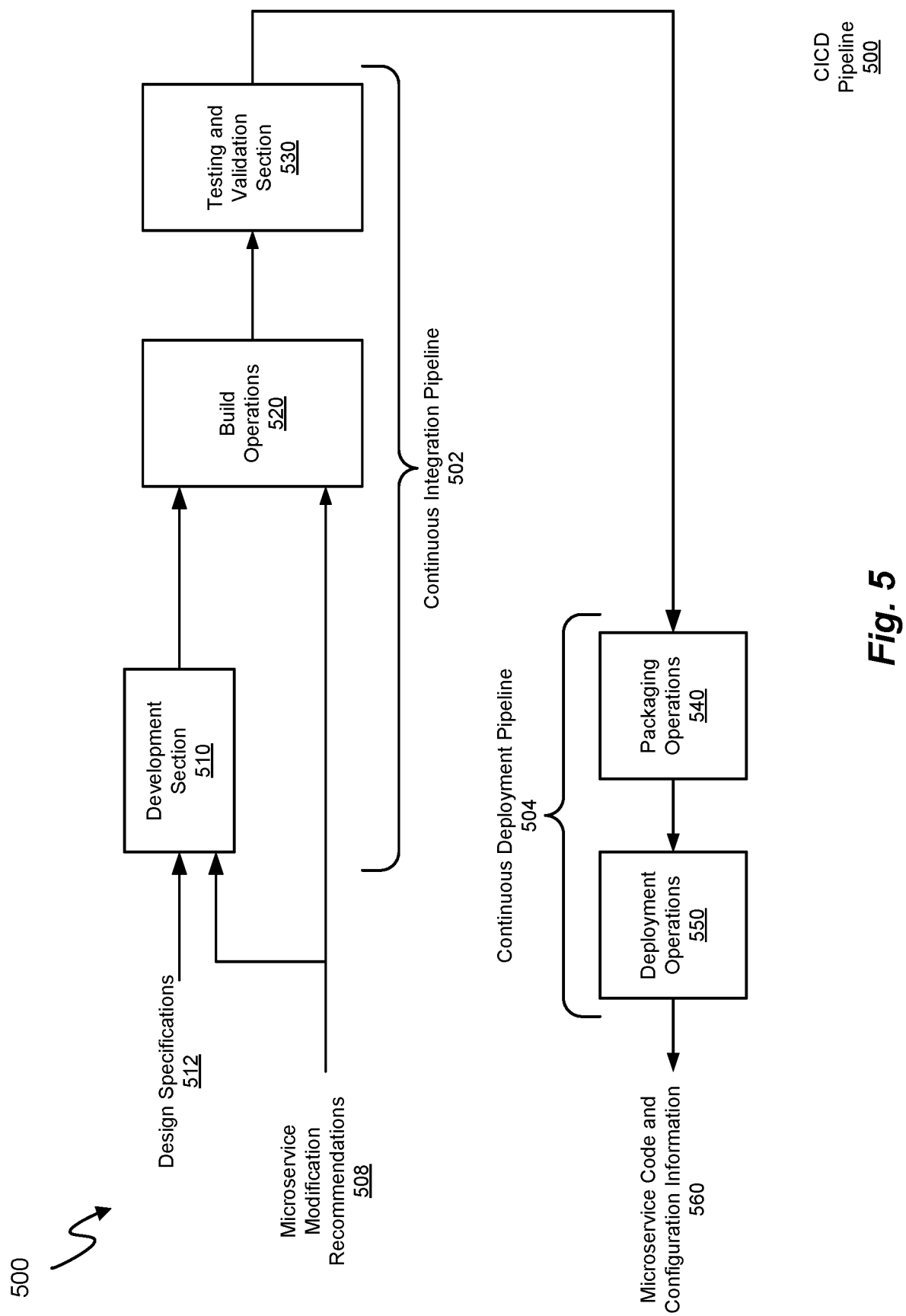
FIG. 5 is a simplified block diagram illustrating an example of a continuous integration, continuous deployment pipeline.

FIG. 5 is a simplified block diagram illustrating an example of a continuous integration, continuous deployment (CICD) pipeline 500, according to some embodiments. In embodiments such as those described herein, a CICD pipeline includes a continuous integration pipeline 502 and a continuous deployment pipeline 504. Continuous integration pipeline 502 provides for the generation and testing of microservice software, which is output to continuous deployment pipeline 504 for packaging and deployment in the cloud 115.

CICD pipeline 500 (and more particularly, continuous integration pipeline 502) can take as its input microservice modification recommendations 508. CICD pipeline 500 can also receive one or more design specifications 512. As will be appreciated in light of the present disclosure, design specifications 512, as well as microservice modification recommendations 508, can be received at a development section 510, which facilitates the manual development of microservices (as opposed to the automatic development of microservices). In such embodiments, microservice modification recommendations 508 can take the form of one or more recommendations as to the transformation, coexistence, or elimination, for example, of one or more microservices (or portion(s) thereof).

Microservice modification recommendations 508 are also received by build operations 520, which can also receive the programmatic code produced by the tasks performed as part of development section 510. Microservice modification recommendations 508 can take the form of one or more indications as to the transformation, coexistence, or elimination, for example, of one or more microservices (or portion(s) thereof), which can be effected by build operations 520 to accomplish the indicated action(s). Build operations 520 build a runnable instance of the microservice of interest by combining elements such as existing source code, new source code, source code modifications, dependencies, and/or other such information (e.g. as may be received from development section 510 and/or as microservice modification recommendations 508). A more detailed example of build operations 520 is provided in connection with FIG. 6 and its associated description, subsequently. One or more of such tests, while envisioned to be performed automatically, can also be performed manually.

The runnable instance of the microservice (or portion thereof) produced as a result of build operations 520 is provided to (also referred to herein as being promoted to) a testing and validation section 530, which performs basic operational testing, unit testing, integration testing, and other such tests on the runnable instance in question. A more detailed example of testing and validation section 530 is provided in connection with FIG. 7 and its associated description, subsequently.

The now tested and validated runnable instance produced by continuous integration pipeline 502 is received by continuous deployment pipeline 504 at packaging operations 540. Packaging operations were 540 produce a software package that is a distributable artifact that is ready for deployment. Packaging operations 540 thus promote a packaged microservice (or portion thereof), which can be packaged and released to deployment operations 550. In so doing, deployment operations 550 can implement improved deployment of such microservices through the receipt of microservice deployment parameters, which allow earlier phases of CICD pipeline 500 to indicate to deployment operations 550 the timing and manner of such deployment (e.g., as by indicating relationships between microservices, which microservices might be mission-critical, inter-microservice communications that should be considered, dependencies, and other such considerations).

Alternatively, packaging operations 540 can promote a packaged microservice (or portion thereof) to a software repository (not shown), in certain embodiments. In the latter case, deployment operations 550 can retrieve such packaged microservices from the software repository on a periodic basis or as part of a manual process. In the latter case, the use of such a repository on a manual basis can be referred to as continuous delivery.

Figure 6:
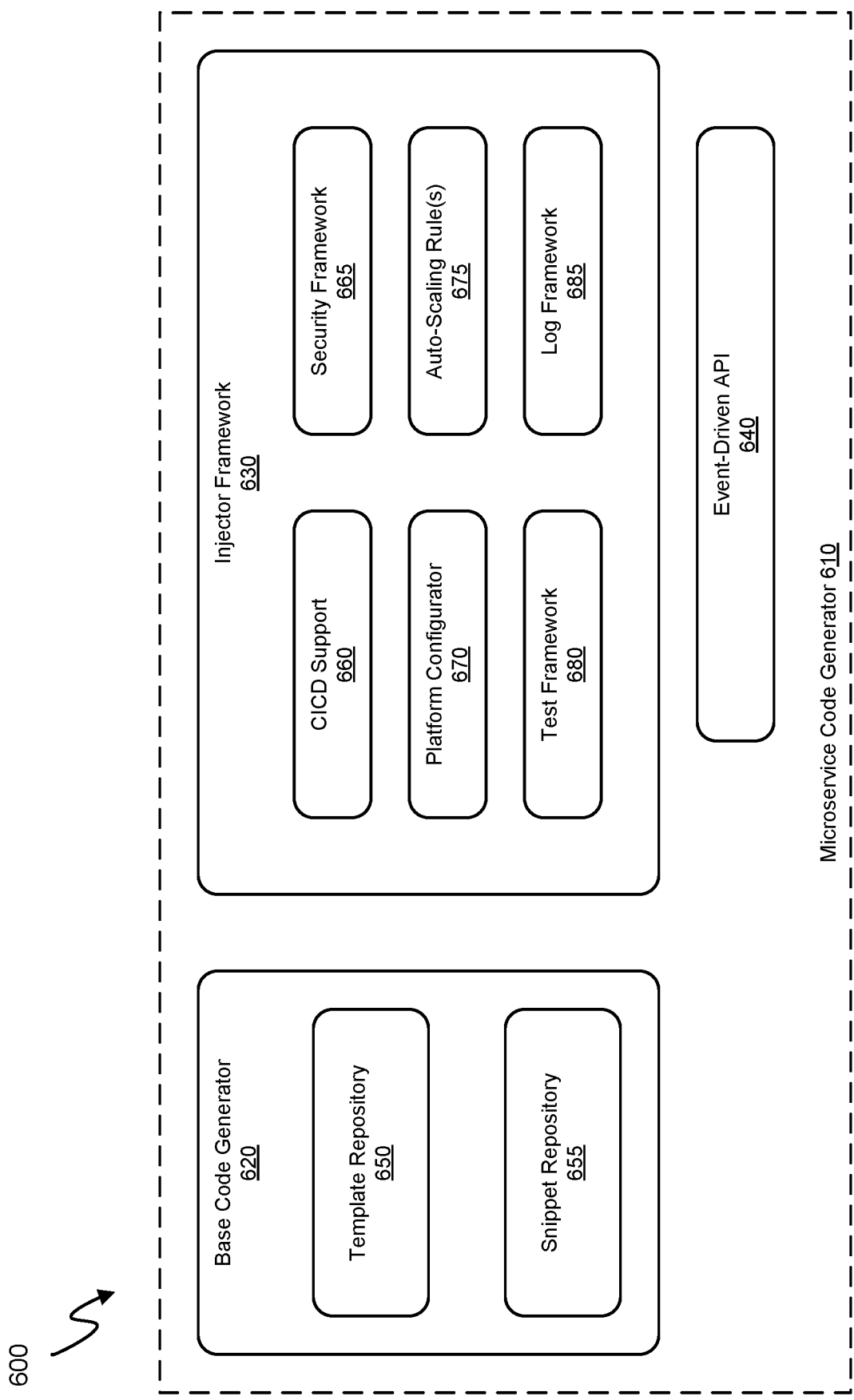
FIG. 6 is a simplified block diagram illustrating an example of a microservice code generator that can be implemented as part of build operations.

FIG. 6 is a simplified block diagram illustrating an example of a microservice code generator 600 that can be implemented as part of build operations. In this example, build operations 520 of FIG. 5 can include a microservice code generator 610. Microservice code generator 610 automates the dynamic generation of program code. Microservice code generator 600 includes a base code generator 620, an injector framework 630, and an event-driven API 640.

Starting with event-driven API 640, events can be defined such that those events are triggered by specific actions or API calls. Such events can be subscribed to, such that their occurrence results in the execution of a microservice. As such, event-driven API 640 facilitates the production, detection, consumption of, and reaction to events. An event can be viewed as "a significant change in state." From a formal perspective, what is produced, published, propagated, detected, or consumed is a typically asynchronous message called an event notification, and not the event itself, which is the state change that triggered the message emission.

Base code generator 620 includes one or more template repositories (an example of which is depicted in FIG. 6 as a template repository 650) and one or more snippet repositories (an example of which is depicted in FIG. 6 as a snippet repository 655). Template repository 650 is a repository of one or more cod having a data structure that stores metadata for a set of files and/or directory structure(s) in which code templates are stored. As such, a set of information in the repository may be centralized or distributed on multiple computing systems. Metadata stored by template repository 650 can include, among other possibilities, a historical record of changes in the repository, a set of commit objects, a set of references to commit objects, and/or other such information. Such information can include such information with reference to representational state transfer (REST) templates, simple object access protocol (SOAP) information, messaging information, database templates and other information, file information, and the like. Snippet repository 655 facilitates maintenance of small portions of re-usable source code, machine code, text, or the like (small being in terms relative to a complete application or one of a number of microservices implementing such an application), such re-use allowing for greater efficiency in the creation of the application or microservice. Snippet repository 655 can be used to maintain small portions designed to provide functionality such as providing alerts, making assignments, performing transformations, error handling, performing replacements, and the like, such as described elsewhere herein.

Injector framework 630 provides a number of functionalities, including, for example, CICD support 660, a security framework 665, a platform configurator 670, one or more auto-scaling rules 675, a test framework 680, and a log framework 685. Injector framework 630, in providing such functionalities, facilitates dependency injection with regard to the microservices produced and managed by CICD pipeline 500. Such dependency injection employs techniques whereby one object supplies the dependencies of another object. A "dependency," then, is an object that can be used as a service. Instead of a client specifying which service it will use, another entity provides instructions to the client as to which service to use. The "injection" refers to the passing of a dependency (a service (microservice), typically) into the object (a client (also a microservice, typically)) that would use that service. The service is made part of the client's state. Passing the service to the client, rather than allowing a client to build or find the service, is thus a fundamental tenet of such an approach. The purpose of such dependency injection thus achieves a separation of concerns in the construction objects by CICD pipeline 500, and their use in the compute cloud, thereby increasing the reusability of the program code thus generated.

To this end, CICD support 660 provides support functionality to CICD pipeline 500 in the form of, for example, blue-green deployment and support of CICD pipeline 500 for multiple environments. Blue-green deployment is a technique that can reduce downtime and risk by supporting, for example, two identical production environments (referred to as "blue" and "green"). At a given time, only one of the environments should be active, with the active environment serving the production traffic being supported.

Security framework 665 supports the secure development and deployment of microservices (or portions thereof) via CICD pipeline 500. In so doing, security framework 665 builds security features into the development of microservices, both with regard to the microservices developed, as well as in the CICD pipeline itself. Platform configurator 670 facilitates the configuring of services in the compute cloud such as a cloud application platform, container service, and/or function services supporting the microservices thus deployed. Information maintained by platform configurator 670 includes one or more deployment descriptors (e.g., one or more configuration files) that describe the manner in which a given component, module, application, or the like (e.g., a microservice or portion thereof) should be deployed. Such a description can be for a given artifact that is to be deployed to given container.

Auto-scaling rules 675 provide support for automatically scaling up/down computing resources needed to support CICD pipeline 500, including scaling support for build operations 520, testing and validation section 530, and/or deployment operations 550. In certain embodiments, auto-scaling rules 675 can include the provision of predictive scaling functionality. Test framework 680 supports the testing and functionality provided by testing and validation section 530. Test framework 680 can provide functionality including automated integration tests (e.g., focusing on messaging integration), REST API automated testing, automated regression testing, and the like. Log framework 685 can provide functionality including activity monitoring, one or more simple abstraction layers for various logging frameworks, generic logging, and the like.

Figure 7:
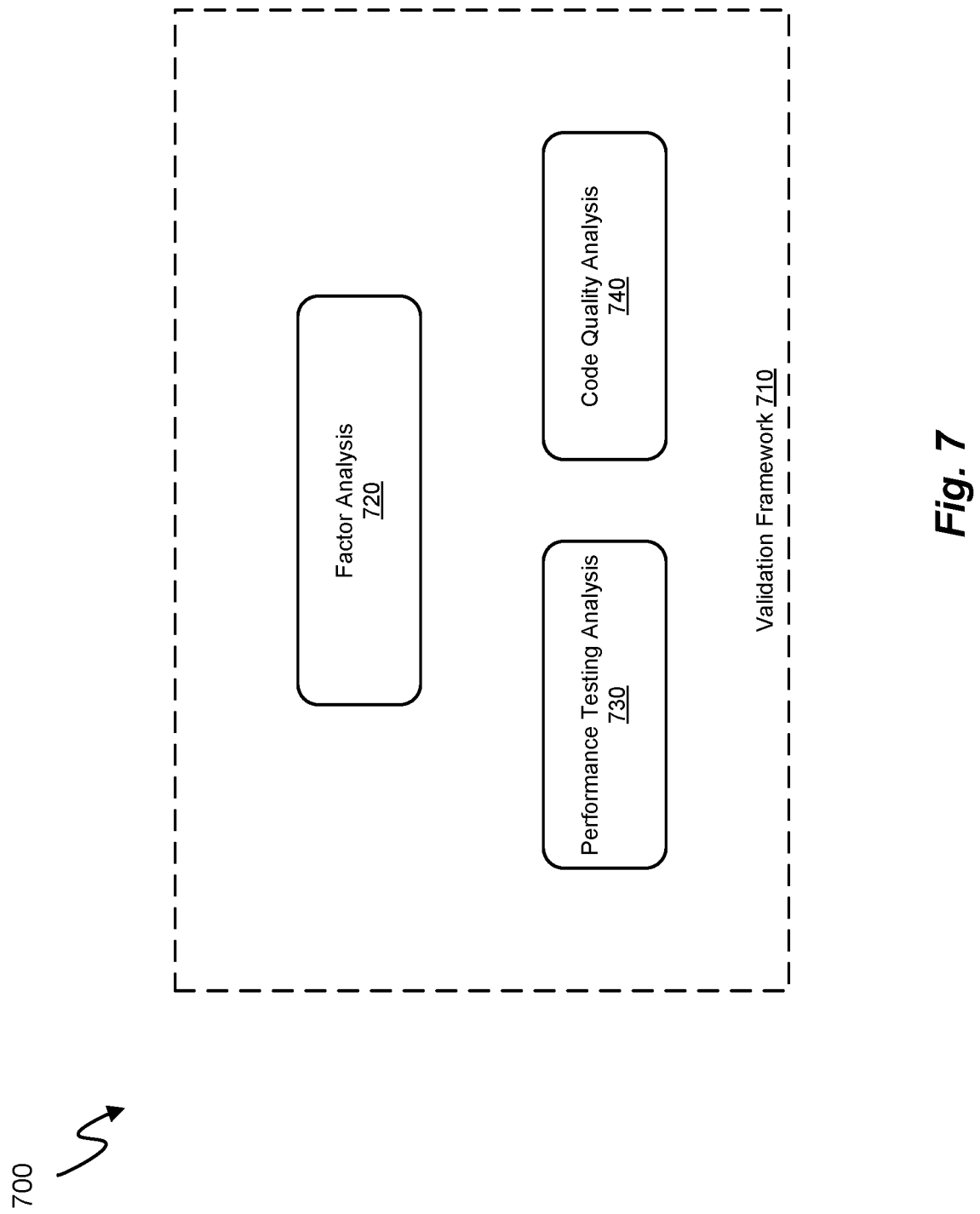
FIG. 7 is a simplified block diagram illustrating one example of a validation and testing framework 700 that can be used in certain embodiments of the disclosed system.

FIG. 7 is a simplified block diagram illustrating one example of a validation and testing framework 700 that can be used to implement a testing and validation section. The testing and validation framework 700 is depicted in FIG. 7 as including a validation framework 710. Validation framework 710 provides a framework for the validation of the microservices (or portions thereof) generated by build operations such as build operations 520. In so doing, validation framework 710 provides functionality that facilitates verification and validation of artifacts, such as microservices, and by comparing such artifacts to their input specifications and making a determination as to whether the artifact meets the needs the artifact was intended to meet.

Validation framework 710 can include, for example, factor analysis 720, performance testing analysis 730, and code quality analysis 740. Factor analysis 720 implements a methodology for building microservices, and takes into account factors such as having a single codebase for a deployed microservice, whether dependencies are declared, burying configurations, backing services, delivery/deployment pipeline factors, state of services and persistent data, concurrency, binding, disposability, environmental factors, logging, administrative processes, and the like. Performance testing analysis 730 can include load testing of the microservice and other such testing, such that a determination can be made as to whether the microservice's speed, responsiveness, and stability meet the requirements for such performance criteria. Code quality analysis 740 can include analyses such as, for example, analyses for identifying security vulnerabilities in the microservices to be deployed and other analyses to provide continuous inspection of code quality by performing automatic reviews with static analysis of code to detect bugs, code smells, and security vulnerabilities.

Example Processes for Making Microservice Modification Recommendations

Figure 8:
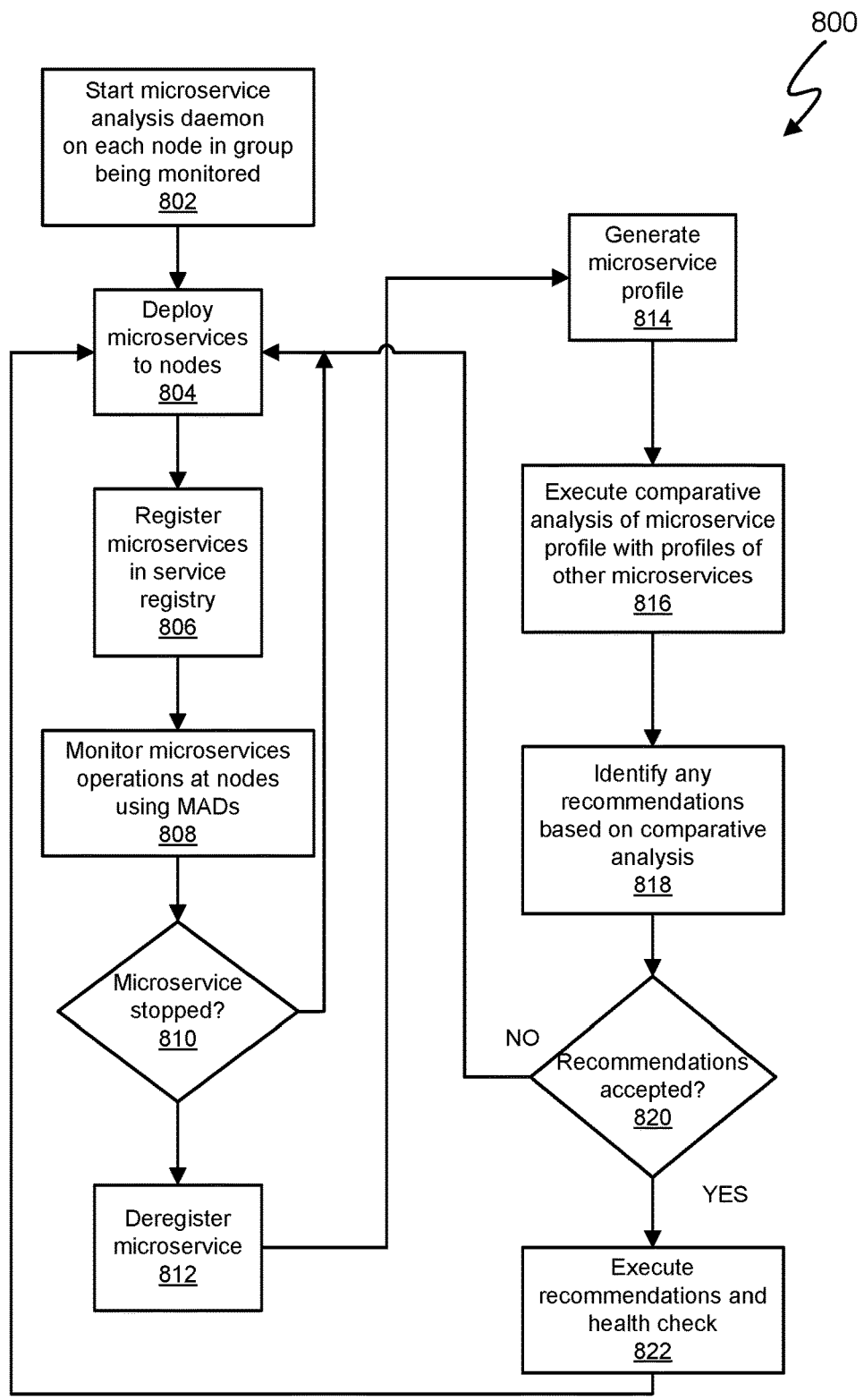
FIG. 8 is a flowchart depicting exemplary operations that may be executed by certain embodiments of the disclosed system.

FIG. 8 is a flowchart 800 depicting exemplary operations that may be executed by certain embodiments of the disclosed system. In this example, microservice analysis daemons are deployed to each node in a group of notes that are to be monitored at operation 802. At operation 804, certain embodiments deploy the microservices to the nodes for execution. In certain embodiments, the microservices are registered in a service registry at operation 806. The service registry is a database populated with information on how to dispatch requests to microservice instances. Interactions between the registry and other components can be divided into two groups, each with two subgroups: 1) interactions between microservices and the registry (registration), which can be implemented using self-registration or third-party registration; and 2) interactions between clients and the registry (discovery), which can be implemented as client-side discovery or server-side discovery. Most microservice-based architectures are in constant evolution. Microservices go up and down as development teams split, improve, deprecate and do their work. Whenever a service endpoint changes, the registry needs to know about the change. As such, registration is used to control who publishes or updates the information on how to reach each service.

At operation 808, the microservice analysis daemons monitor the run-time behavior of microservices executed on the corresponding node. Monitoring operations may include, for example, recording the HTTP addresses of data received by the microservice, recording the HTTP addresses to which the microservice sends data, the payloads of the communications, the format of the payloads, etc.

At operation 810, a check is made as to whether any microservices have been stopped. If not, active deployment, execution, and registration operations for new microservice instances (if any) continue at operation 804, while existing microservice instances continue to be monitored at operation 808 by the microservice analysis daemons. If a determination is made at operation 810 that a microservice instance is stopped, the microservice is registered from the service registry at operation 812 and a profile for the microservice is generated at operation 814. At operation 816, certain embodiments execute a comparative analysis of the microservice profile with profiles of other microservices as described herein. At operation 818, certain embodiments identify any microservice modification recommendations based on the comparative analysis executed at operation 816.

At operation 820, a decision is made as to whether the microservice modification recommendations are to be accepted. In certain embodiments, microservice modification recommendations may be automatically implemented with a minimal amount of human interaction. In other embodiments, the microservice owner makes a decision as to whether the recommendations are to be accepted. In either instance, if the modification recommendations are accepted, the recommendations and a health check are executed at operation 822, after which active deployment, execution, and registration operations for new microservice instances (if any) continue at operation 804, while existing microservice instances continue to be monitored at operation 808 by the microservice analysis daemons. In certain embodiments, if the modification recommendations are not accepted, active deployment, execution, and registration operations for new microservice instances (if any) continue at operation 804, while existing microservice instances continue to be monitored at operation 808 by the microservice analysis daemons.

Figure 9:
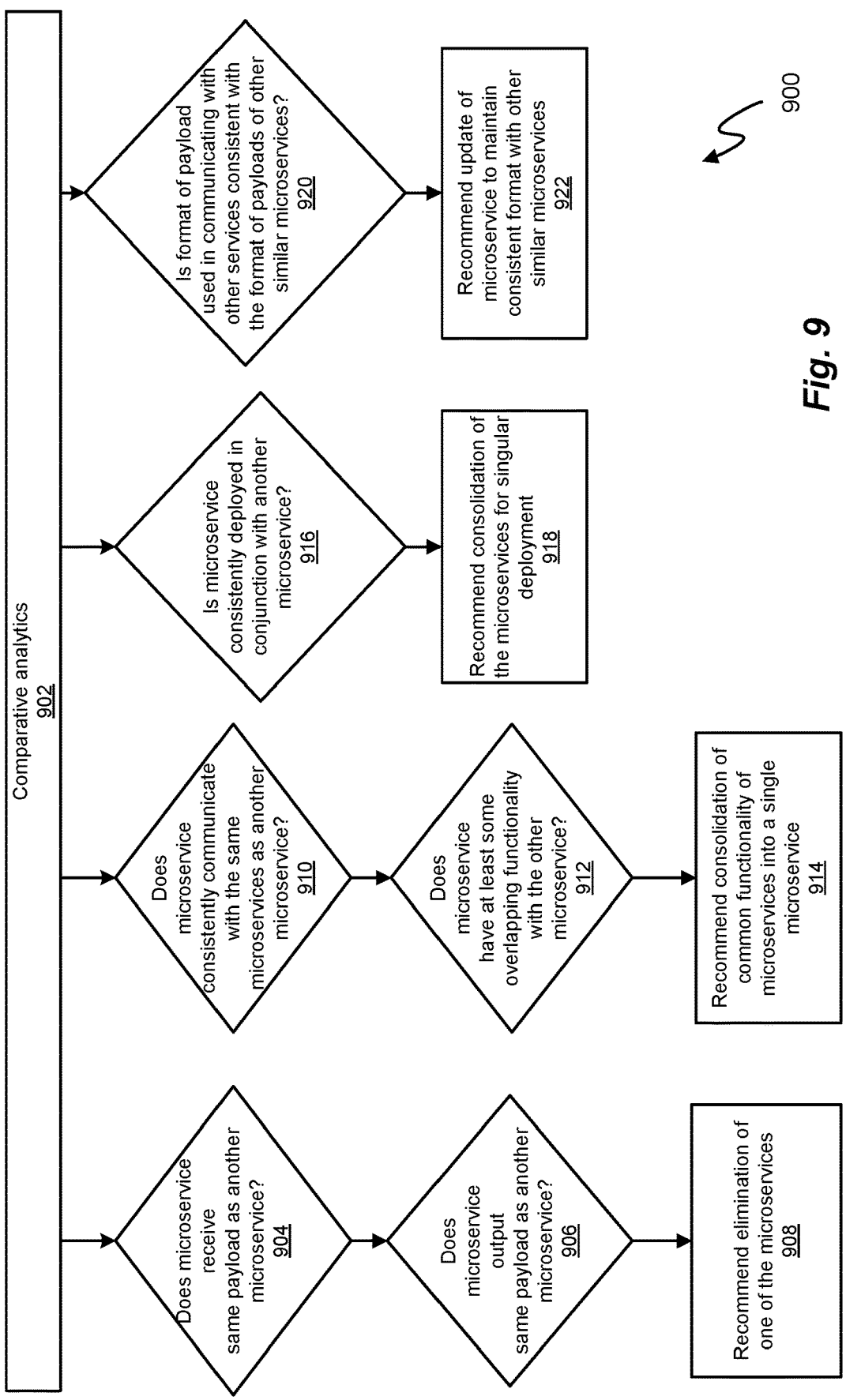
FIG. 9 is a diagram showing exemplary outputs of the comparative analytics and exemplary modification recommendations that are considered when certain comparative conditions exist.

FIG. 9 is a diagram 900 showing exemplary outputs of the comparative analytics 902 and exemplary modification recommendations that are considered when certain comparative conditions exist. In this example, a determination is made at operation 904 as to whether the microservice of interest receives the same payload as another microservice. If so, a check is made at operation 906 as to whether the output of the microservice of interest outputs the same payload as another microservice. If both conditions are met, it may be that one of the microservices may be deleted. As such, the disclosed system may recommend the elimination of one of the microservices at operation in 908 so that only the selected microservice is used. In such instances, the manpower needed to maintain the microservices is reduced since only one of the microservices needs to be maintained by the microservice owner.

At operation 910, a determination is made as to whether the microservice of interest consistently communicates with the same microservices as another microservice. A further determination may be made at operation 912 as to whether the microservice of interest has at least some overlapping functionality with the other microservice. If so, certain embodiments may recommend consolidation of the functionality of the microservices into a single microservice as shown at operation 914.

In another use case, a determination is made at operation 916 as to whether a microservices consistently deployed in conjunction with another microservice. If so, certain embodiments may recommend consolidation of the microservices for deployment as a single microservice at operation 918 to simplify deployment operations.

In a further use case, a determination is made at operation 920 as to whether the format of the payload used by the microservice of interest to communicate with other microservices consistent with the format of payloads of other similar micro services. As an example, the payload of the microservice of interest may have a sequence of data including an account identifier, account sales, and account address (e.g., Account_ID, Account_Sales, Account_Address). However, a comparison of the microservice of interest with other microservices using the same payload data may indicate that the other microservices use a different sequence for the same data (e.g., Account_ID, Account_Address, Account_Sales). In such instances, a recommendation may be made at operation 922 that the microservice of interest should be modified to maintain a consistent payload format with the other similar microservices.

The systems described herein can be implemented using a variety of computer systems and networks. The following illustrates an example configuration of a computing device that may be used to implement in the disclosed system. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory and mass storage devices, may be used to store software and data, such as, for example, an operating system, one or more drivers (e.g., including a video driver for a display), one or more applications, and data. Examples of such computing and network environments are described below with reference to FIGS. 10 and 11.

Figure 10:
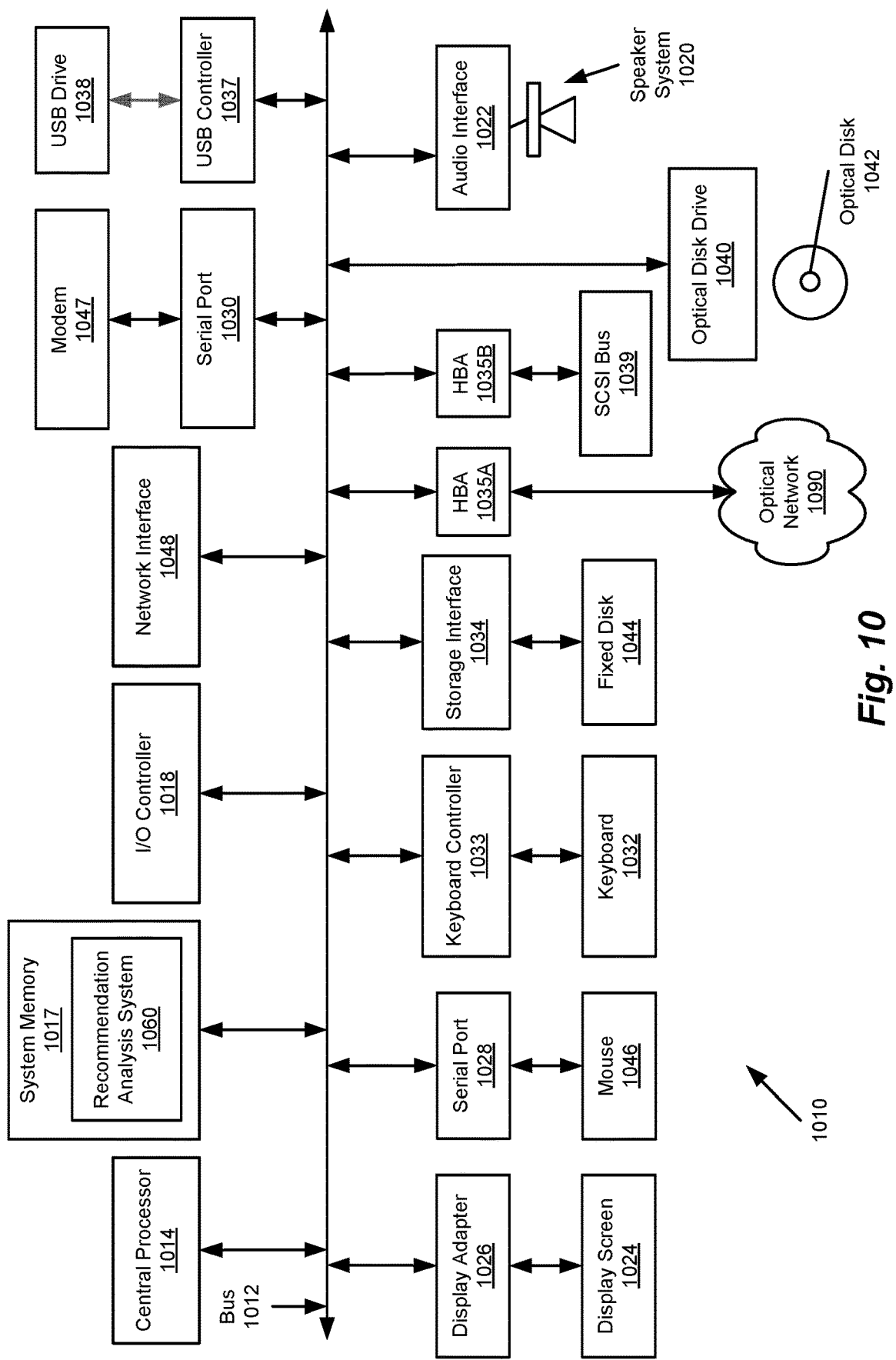
FIG. 10 illustrates an example configuration of a computing device that can be used to implement the systems and techniques described herein.

FIG. 10 depicts a block diagram of a computer system 1010 suitable for implementing aspects of the systems described herein, and so can be viewed as an example of a computing device supporting a microservice management system. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a USB controller 1037 operative to receive a USB drive 1038, a host bus adapter (HBA) interface card 1035A operative to connect with a optical network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1010 are generally stored on and accessed from a computer-readable storage medium, such as a hard disk drive (e.g., fixed disk 1044), an optical drive (e.g., optical drive 1040), a universal serial bus (USB) controller 1037, or other computer-readable storage medium.

Storage interface 1034, as with the other storage interfaces of computer system 1010, can connect to a standard computer-readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the systems described herein. The devices and subsystems can be interconnected in different ways from that shown in FIG. 10. The operation of a computer system such as that shown in FIG. 10 is readily known in the art and is not discussed in detail in this application. Code to implement portions of the systems described herein can be stored in computer-readable storage media such as one or more of system memory 1017, fixed disk 1044, optical disk 1042, or floppy disk. The operating system provided on computer system 1010 may be WINDOWS, UNIX, LINUX, IOS, or other operating system. To this end, system memory 1017 is depicted in FIG. 10 as storing code implementing a microservice modification recommendation analysis system 1060 in the manner discussed herein.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
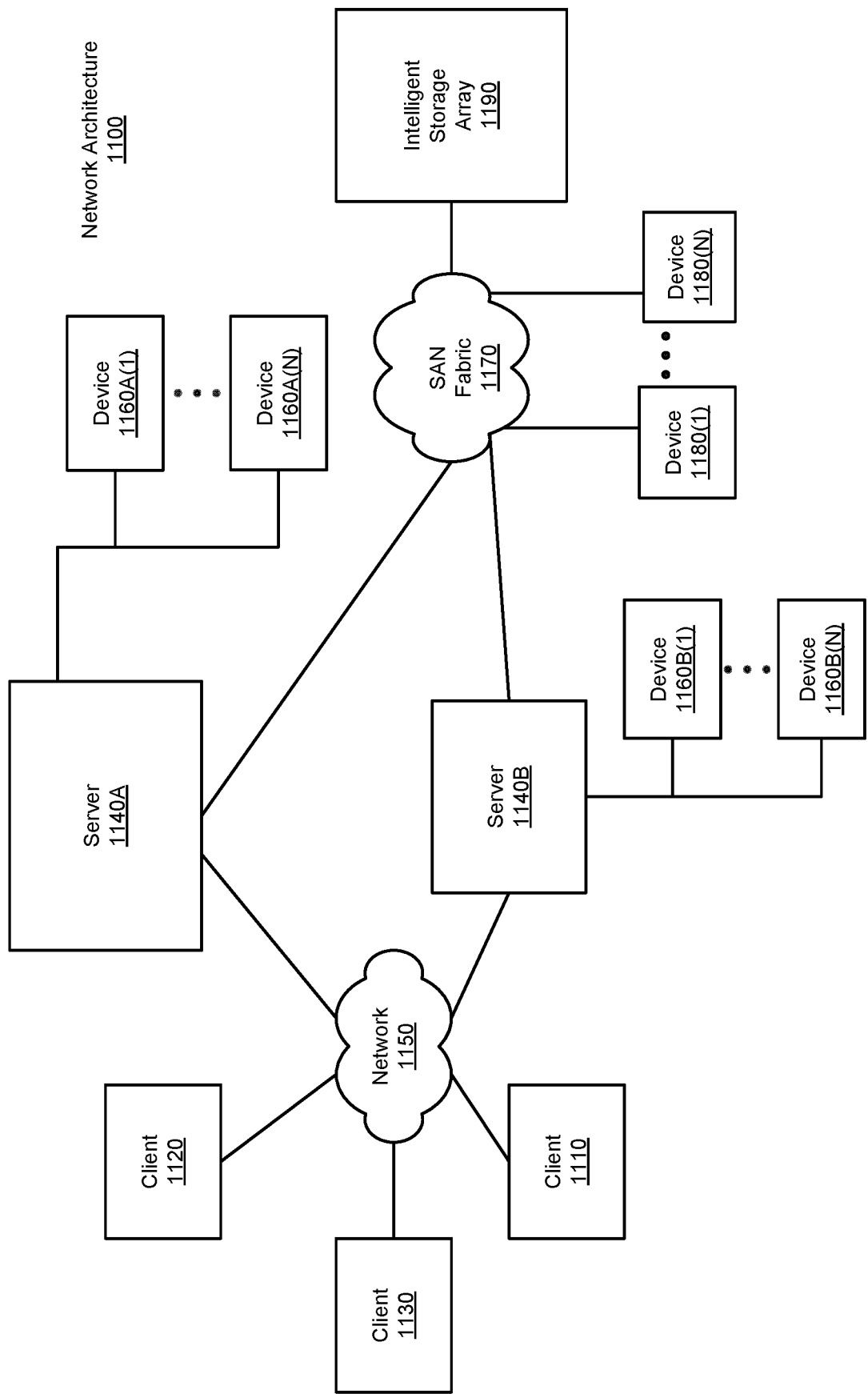
FIG. 11 illustrates an example configuration of a network architecture in which the systems and techniques described herein can be implemented.

FIG. 11 is a block diagram depicting a network architecture 1100 in which client systems 1110, 1120 and 1130, as well as storage servers 1140A and 1140B (any of which can be implemented using computer system 1010), are coupled to a network 1150. Storage server 1140A is further depicted as having storage devices 1160A(1)-(N) directly attached, and storage server 1140B is depicted with storage devices 1160B(1)-(N) directly attached. Storage servers 1140A and 1140B are also connected to a SAN fabric 1170, although connection to a storage area network is not required for operation. SAN fabric 1170 supports access to storage devices 1180(1)-(N) by storage servers 1140A and 1140B, and so by client systems 1110, 1120 and 1130 via network 1150. An intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to network 1150. Client systems 1110, 1120 and 1130 are able to access information on storage server 1140A or 1140B using, for example, a web browser or other client software (not shown). Such a client/server architecture allows client systems 1110, 1120 and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the systems described herein are not limited to the Internet or any particular network-based environment.

OTHER EMBODIMENTS

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1010). Such architectures are merely examples, and many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art based on the teachings of the present disclosure. Reference in the specification to "one implementation," "this implementation," "these implementations," "some implementations," and "certain embodiments" means that a particular feature, structure, or characteristic described is included in at least one implementation, and the appearances of these phrases in various places in the specification are not necessarily all referring to the same implementation. As such, the various embodiments of the systems are described herein through the use of block diagrams, flowcharts, and examples. Each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the disclosed system has been described in connection with several embodiments, the disclosed system is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method for managing microservices, comprising:
   executing a plurality of microservice analysis daemons on nodes of a network;
   deploying a plurality of microservices to the nodes of the network;
   registering the plurality of microservices executed at the nodes of the network with a service registry;
   gathering execution characteristic data for the plurality of microservices using the microservice analysis daemons, wherein the microservice analysis daemons gather execution characteristic data for microservices executed at the node at which the microservice analysis daemon is deployed;
   generating microservice profiles for the plurality of microservices using execution characteristics data obtained from the microservice analysis daemons and data retrieved from the service registry and using microservice information that includes tokens identified from lexical analysis of a microservice codebase, wherein the microservice codebase includes code for the plurality of microservices;
   executing a comparison operation using the microservice profiles;
   determining as a result of the comparison operation that:
      a microservice receives the same microservice payload type as another microservice, and
      the microservice outputs the same microservice payload type as the other microservice;

making a recommendation to eliminate the microservice and use the other microservice based on the determined result of the comparison operation; and making a further recommendation to consolidate functionality of the microservice with the other microservice when the microservice consistently communicates with the same microservices as the other microservice and has at least some overlapping functionality.

2. The computer-implemented method of claim 1, wherein
the microservice information is retrieved from a datastore, and wherein the microservice information includes information for the microservices provided by microservice owners.

3. The computer-implemented method of claim 1, wherein
the microservice profiles include records respectively associated with the microservice profiles, wherein the record for a profile includes tokenized information including one or more of:
keywords associated with code characteristics of the microservice;
variables and/or function names used by the microservice;
literals used by the microservice; and
text comments associated with the microservice.

4. The computer-implemented method of claim 1, further comprising:
making a further recommendation to update the microservice to maintain a consistent payload format with other similar microservices.

5. The computer-implemented method of claim 1, wherein the result of the comparison operation is received from a recurrent neural network.

6. The computer-implemented method of claim 5, wherein the recurrent neural network comprises a long short-term memory recurrent neural network.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
executing a plurality of microservice analysis daemons on nodes of a network;
deploying a plurality of microservices to the nodes of the network;
registering the plurality of microservices executed at the nodes of the network with a service registry;
gathering execution characteristic data for the plurality of microservices using the microservice analysis daemons, wherein the microservice analysis daemons gather execution characteristic data for microservices executed at the node at which the microservice analysis daemon is deployed;
generating microservice profiles for the plurality of microservices using execution characteristics data obtained from the microservice analysis daemons and data retrieved from the service registry and using microservice information that includes tokens identified from lexical analysis of a microservice codebase, wherein the microservice codebase includes code for the plurality of microservices;
executing a comparison operation using the microservice profiles;
determining as a result of the comparison operation that:
a microservice receives the same payload type as another microservice, and
the microservice outputs the same payload type as the other microservice;
making a recommendation to eliminate a microservice and use another microservice based on the determined result of the comparison operation; and
making a further recommendation to consolidate functionality of the microservice with the other microservice when the microservice consistently communicates with the same microservices as the other microservice and has at least some overlapping functionality.

8. The system of claim 7, wherein
the microservice information is retrieved from a datastore, and wherein the microservice information includes information for the microservices provided by microservice owners.

9. The system of claim 7, wherein
the microservice profiles include records respectively associated with the microservice profiles, wherein the record for a profile includes tokenized information including one or more of:
keywords associated with code characteristics of the microservice;
variables and/or function names used by the microservice;
literals used by the microservice; and
text comments associated with the microservice.

10. The system of claim 7, wherein the instructions are further configured for:
making a further recommendation to update the microservice to maintain a consistent payload format with other similar microservices.

11. The system of claim 7, wherein the instructions are further configured for:
modifying the microservice based on analyzing the recommendation, and
providing the modified microservice to a continuous integration, continuous deployment (CICD) pipeline.

12. The system of claim 7, wherein the lexical analysis comprises identifying the tokens using machine learning to determine potential token names and token occurrences in the code for the plurality of microservices.

13. A non-transitory, computer-readable storage medium embodying computer program code, the computer program code comprising computer executable instructions configured for:
executing a plurality of microservice analysis daemons on nodes of a network;
deploying a plurality of microservices to the nodes of the network;
registering the plurality of microservices executed at the nodes of the network with a service registry;
gathering execution characteristic data for the plurality of microservices using the microservice analysis daemons, wherein the microservice analysis daemons gather execution characteristic data for microservices executed at the node at which the microservice analysis daemon is deployed;
generating microservice profiles for the plurality of microservices using execution characteristics data obtained from the microservice analysis daemons and data retrieved from the service registry and using microservice information that includes tokens identified from lexical analysis of a microservice codebase, wherein the microservice codebase includes code for the plurality of microservices;

executing a comparison operation using the microservice profiles;

determining as a result of the comparison operation that:
  a microservice receives the same payload type as another microservice, and
  the microservice outputs the same payload type as the other microservice;

making a recommendation to eliminate a microservice and use another microservice based on the determined result of the comparison operation; and making a further recommendation to consolidate functionality of the microservice with the other microservice when the microservice consistently communicates with the same microservices as the other microservice and has at least some overlapping functionality.

14. The non-transitory, computer-readable storage medium of claim 13, wherein
the microservice information is retrieved from a datastore, and wherein the microservice information includes information for the microservices provided by microservice owners.

15. The non-transitory, computer-readable storage medium of claim 13, wherein
the microservice profiles include records respectively associated with the microservice profiles, wherein the record for a profile includes tokenized information including one or more of:
keywords associated with code characteristics of the microservice;
variables and/or function names used by the microservice;
literals used by the microservice; and
text comments associated with the microservice.

16. The non-transitory, computer-readable storage medium of claim 13, wherein the instructions are further configured for:
displaying, at a user interface, the recommendation to an owner of the microservice;
receiving, from the user interface, a modification of the microservice from the microservice owner based on the recommendation, and
providing the modified microservice to a continuous integration, continuous deployment (CICD) pipeline.

17. The non-transitory, computer-readable storage medium of claim 13, wherein the lexical analysis comprises identifying the tokens using term frequency-inverse document frequency analysis of the code for the plurality of microservices.

* * * * *